United States Patent [19]
Dismukes

[11] Patent Number: 5,192,514
[45] Date of Patent: Mar. 9, 1993

[54] METHOD OF REMOVING SELENIUM FROM FLUE GASES

[75] Inventor: Edward B. Dismukes, Birmingham, Ala.

[73] Assignee: Electric Power Research Institute, Inc., Palo Alto, Calif.

[21] Appl. No.: 840,452

[22] Filed: Feb. 24, 1992

[51] Int. Cl.$^5$ .......................... B01D 47/00; B01J 8/00; C01B 19/00
[52] U.S. Cl. ..................................... 423/210; 423/508
[58] Field of Search ................. 423/210, 508, 509, 510

[56] References Cited

U.S. PATENT DOCUMENTS 2,409,835  10/1946  Clark et al. ........................... 423/510
3,966,889   6/1976  Kakuta et al. .
4,931,073   6/1990  Miller et al. .

OTHER PUBLICATIONS

Andren, Anders W. and Klein, David H.; "Selenium in Coal-Fired Steam Plant Emissions"; *Environmental Science & Technology*; vol. 9, No. 9, Sep. 1975.

Ericzon, Christina et al; "Determination and Speciation of Selenium in End Products from a Garbage Incinerator"; Environ Sci. Technol, vol. 23, No. 12, 1989.

Felix, Larry G., Merritt, Randy L. and Duncan, Kent; "Improving Baghouse Performance"; APCA Journal, vol. 36, No. 9, Sep. 1986.

*Primary Examiner*—Gregory A. Heller
*Attorney, Agent, or Firm*—Flehr, Hohbach, Test, Albritton & Herbert

[57] ABSTRACT

A method of removing gaseous selenium from a flue gas is disclosed. The method includes injecting an effective amount of ammonia into the flue gas to produce a solid selenium reaction product. The solid selenium reaction product is removed from the flue gas by undergoing deposition in a filter assembly. The filter assembly may then be cleaned through conventional methods.

12 Claims, 1 Drawing Sheet

METHOD OF REMOVING SELENIUM FROM FLUE GASES

BRIEF DESCRIPTION OF THE INVENTION

This invention relates generally to the suppression of pollutants in power plant flue gases. More particularly, this invention relates to the removal of selenium from flue gases by injecting ammonia into the flue gases to produce solid selenium which is deposited on a filter.

BACKGROUND OF THE INVENTION

Selenium is a trace metal found in U.S. coals. It has been estimated that the concentration of selenium in U.S. coals has an overall average value of approximately 4 parts-per-million (ppm) by weight. The range of concentrations throughout coals found in this country is roughly 0.1 to 10 ppm by weight.

At the average concentration of 4 ppm by weight in the coal, combustion will produce a concentration of the oxide, $SeO_2$, of approximately 0.12 ppm by volume in the flue gas. Alternatively, if the selenium is found as a component of the ash, the concentration in the solid will be about 50 ppm by weight.

Evidence suggests that little of the selenium will be discharged from the furnace in bottom ash and virtually all will be found in some form in the combustion gas, either as a vapor or as a solid component of the fly ash. The relative proportions of selenium in the gas state and in the fly ash will depend upon the temperature. As a general rule, the gaseous state will be predominant at high temperatures, and the solid state will prevail at low temperatures. Thus, the emission of selenium from a furnace operating with a coal having the typical selenium concentration will be something less than 0.12 ppm by volume of vapor and up to 50 ppm by weight in the fly ash.

The literature reveals different viewpoints on the chemical state of selenium in flue gas in the vapor state. Some authors hold that the vapor is the free element, occurring perhaps most abundantly at 150° C. as $Se_6$. Others argue that the predominant vapor form is selenium dioxide ($SeO_2$), where the element exists in the IV oxidation state. The invention claimed here pertains to the control of that part of the vapor that occurs as the oxide.

The Clean Air Act of 1990 lists 189 air toxics that may be subject to control under new EPA regulations. Selenium is one of the 189 classes of pollutants. Presently, selenium emissions from power plants are not regulated; however, the U.S. Environmental Protection Agency is presently reviewing emissions of a broad range of potentially toxic materials, and regulations governing selenium as well as other metallic elements are a possibility in the near future.

Existing devices for particulate control include electrostatic precipitators (ESPs), baghouses, and scrubbers. These devices do not remove gaseous selenium by design. Whatever removal of selenium that occurs in these devices is incidental to the primary operation, which is the removal of fly ash or sulfur dioxide ($SO_2$). Whatever removal occurs is more likely to involve the elemental state than the oxide of selenium, since the element is less volatile than the oxide. Scrubbers, however, may be more effective for capturing the oxide than ESPs or baghouses since $SeO_2$ may dissolve along with $SO_2$ in the scrubber fluid. A measure of the impact of the volatility of selenium on the total emissions of selenium is given by the result of one investigation of trace-metal collection in an ESP; the results of this investigation showed that 93% of the selenium passing the ESP and being emitted to the atmosphere was in the vapor state, largely as the oxide.

OBJECTS AND SUMMARY OF THE INVENTION

It is a general object of the present invention to provide a method for removal of selenium from flue gases.

It is a related object of the present invention to provide a method of removing gaseous selenium from flue gases and placing it in the form of a solid in the dustcake being deposited on a fabric filter.

It is a related object of the present invention to provide a method by which a baghouse may be efficiently used to remove gaseous selenium.

These and other objects are obtained by a method of removing gaseous selenium from a flue gas. The method includes injecting an effective amount of ammonia into the flue gas to produce a solid selenium reaction product. The solid selenium reaction product is removed from the flue gas by undergoing deposition in a filter assembly. The filter assembly may then be cleaned through conventional methods.

BRIEF DESCRIPTION OF THE DRAWINGS

For a better understanding of the nature and objects of the invention, reference should be made to the following detailed description in conjunction with the accompanying drawing.

DETAILED DESCRIPTION OF THE INVENTION

Figure 1:
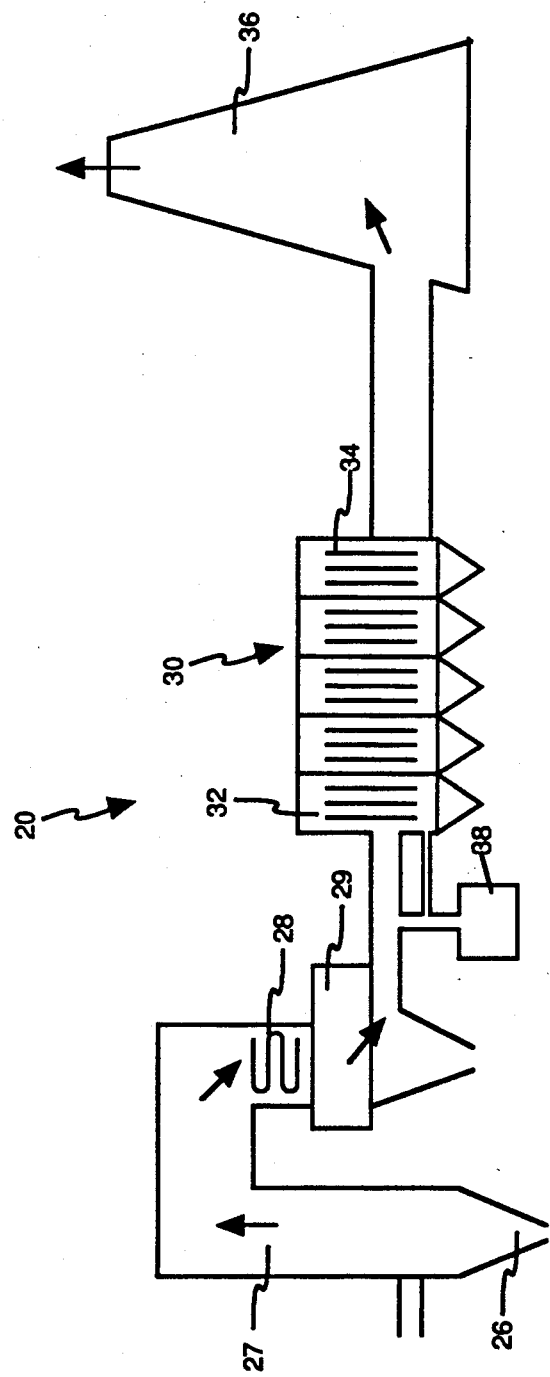
FIG. 1 depicts a coal-fired steam plant in which the present invention may be used.

FIG. 1, depicting a power plant 20, aids in describing this invention. Coal combustion occurs in the combustor 26. The hot gases may be conveyed to a boiler 27 and a heat exchanger 28 (which may be an economizer). The hot gases transfer heat to steam as a working fluid; the steam then drives a turbine (not shown). The turbine converts thermal energy to electrical energy. After the flue gases leave the heat exchanger 26, they are conveyed through another heat exchanger known as an air heater 29, where the gases are cooled and the combustion air being supplied to the combustor 26 is preheated. Next, the gases are passed through the baghouse 30, where a substantial fraction (usually 99% or more) of the entrained fly ash is removed as a filter cake deposited on filter fabrics 32 within compartments 34 of baghouse 30. Finally, the relatively clean gases are emitted to the atmosphere through the stack 36.

The components of the steam plant discussed in the foregoing paragraph are well known in the art. A plant in this configuration does not effectively remove selenium from the flue gases. To remedy this shortcoming, an ammonia injector 38 is introduced. The ammonia injector consists of 1) a vaporizer of compressed, liquid ammonia or other suitable source of ammonia gas and 2) an array of nozzles in the main flue gas duct. The injector adds the ammonia to the main stream of flue gases between the air heater 29 and the baghouse 30. The injector 38 may also add the ammonia in the baghouse 30. While the ammonia in the flue gas is being diluted, heated, and mixed with the flue gases (to produce a final concentration of the order of 30 ppm by volume), a chemical reaction takes place between the ammonia added and the SeO₂ originally in the duct. The solid selenium in the elemental state that is a product of this reaction is deposited along with fly ash in the filtration surfaces of the baghouse. The rate of injection of ammonia is proportional to the rate of flow of selenium and other components of the flue gases. The science of thermodynamics teaches that a trivial molar excess of ammonia will drive the reaction to completion. In practice, an excess may be practically desirable to drive the reaction forward at a greater rate.

The selenium deposited by the above chemical reaction is intimately bonded (physically) to the individual fly ash particles, at a minute concentration (of the order of 50 ppm by weight, or less, as indicated in the earlier discussion). The filtration elements may then be cleaned by any of the methods currently used in utility applications: reverse-gas, shake-deflate, or pulse-jet cleaning.

EXAMPLE

The principles discussed herein have been applied in a 330-MW power generating unit which burns Eastern bituminous coal containing about 2% sulfur. The boiler has a tangentially-fired, pulverized-coal furnace. It produces steam at 2,400 psi at 1000° F. The flue gas from the furnace is cleaned in a multiple compartment baghouse, which is operated in the reverse-gas cleaning mode. The air-to-cloth ratio is 2.1 acfm/ft². The operating temperature is approximately 300° F.

Information acquired during the course of operating the baghouse with ammonia injected in the inlet duct to produce concentration of the order of 20-30 ppm by volume in the flue gas showed clearly that selenium was removed from the flue gas and deposited on the ash filter cake in the baghouse. Analysis of the residual filter cake on part of the fabric filter showed the presence of elemental selenium in various ways. The presumed process that led to the deposition of selenium in the filter cake is expressed by the following chemical reaction:

$$4NH_3(g) + 3SeO_2(g) = 2N_2(g) + 6Se(s) + 6H_2O(g)$$

The foregoing description of a specific embodiment of the present invention has been presented for purposes of illustration and description. It is not intended to be exhaustive or to limit the invention to the precise form disclosed. Obviously, other modifications and variations are possible in light of the above teaching. The embodiment was chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed:

1. A method of removing gaseous selenium from a glue gas produced by the combustion of a carbonaceous fuel, said method comprising the steps of:
   injecting ammonia within said flue gas in an effective amount to react with said gaseous selenium of said flue gas at a temperature of approximately 300° F. to produce a solid selenium reaction product; and
   providing a filter assembly for receiving said solid selenium reaction product.
2. The method of claim 1 wherein said injecting step includes injecting ammonia so as to produce an ammonia concentration up to 30 ppm in said flue gas.
3. The method of claim 2 wherein said providing step includes placing said filter assembly in a baghouse.
4. The method of claim 3 further including the step of cleaning said filter assembly to remove said solid selenium reaction product.
5. A method of converting gaseous selenium to solid selenium, said method comprising the steps of:
   positioning an array of nozzles within a conduit conveying flue gases of approximately 300° F. from a combustor to a filter assembly, said flue gases including fly ash;
   injecting a predetermined amount of ammonia through said array of nozzles into said flue gases to produce a solid selenium reaction product; and
   providing a filter assembly for receiving said solid selenium reaction product, said solid selenium reaction product forming a solid dustcake on said filter assembly, whereby said gaseous selenium is substantially converted to said dustcake on said filter assembly.
6. The method of claim 5 wherein said injecting step includes injecting ammonia so as to produce an ammonia concentration up to 30 ppm in said flue gases.
7. The method of claim 6 wherein said providing step includes placing said filter assembly in a baghouse.
8. The method of claim 7 further including the step of cleaning said filter assembly to remove said selenium reaction product.
9. A method of converting gaseous selenium to solid selenium, said method comprising the steps of:
   combusting a carbonaceous fuel to form a flue gas including gaseous selenium at approximately 300° F.;
   injecting ammonia at a concentration to produce a solid selenium reaction product; and
   receiving said solid selenium reaction product with a fabric filter, whereby said solid selenium reaction product is deposited on said fabric filter.
10. The method of claim 9 wherein said injecting step includes injecting ammonia so as to produce an ammonia concentration up to 30 ppm in said flue gas.
11. The method of claim 10 wherein said receiving step includes placing said filter assembly in a baghouse.
12. The method of claim 11 further including the step of cleaning said filter assembly to remove said selenium reaction product.

* * * * *